United States Patent [19]

Kijima et al.

[11] Patent Number: 5,786,427
[45] Date of Patent: *Jul. 28, 1998

[54] HIGHLY RIGID PROPYLENIC RESIN AND BLOW MOLDED ARTICLE MADE THEREFROM

[75] Inventors: Masato Kijima; Masayuki Shinohara; Minoru Sugawara; Koki Hirano, all of Ichihara, Japan

[73] Assignee: Idemitsu Petrochemical Co., Ltd., Tokyo, Japan

[*] Notice: The term of this patent shall not extend beyond the expiration date of Pat. No. 5,736,613.

[21] Appl. No.: 873,454

[22] Filed: Jun. 12, 1997

Related U.S. Application Data

[63] Continuation of Ser. No. 605,133, filed as PCT/JP95/01406, Jul. 14, 1995.

[30] Foreign Application Priority Data

Jul. 15, 1994 [JP] Japan ................... 6-164111

[51] Int. Cl.[6] ............................................. C08F 297/08
[52] U.S. Cl. .................... 525/322; 525/323; 525/247; 525/270; 264/331.15
[58] Field of Search ............................ 525/247, 270, 525/322, 323; 264/331.15

[56] References Cited

U.S. PATENT DOCUMENTS

| | | | |
|---|---|---|---|
| 4,291,138 | 9/1981 | Sato et al. | 525/247 |
| 4,550,145 | 10/1985 | Kasahara et al. | 525/267 |
| 5,077,341 | 12/1991 | Saito et al. | 525/270 |

*Primary Examiner*—Mark Nagumo
*Attorney, Agent, or Firm*—Oblon, Spivak, McClelland, Maier & Neustadt, P.C.

[57] ABSTRACT

There are provided a highly rigid propylenic resin which has a melt index MI in the range of 0.1 to 1.2 g/10 minutes as determined at 230° C. under 2.160 kg load and also satisfies a relationship between the MI and the elongational viscosity [Y(Pa.s)], said relationship being represented by the expression $$2.0 \times 10^5 \times MI^{-0.68} \leq Y \leq 8.0 \times 10^5 \times MI^{-0.68};$$

and a blow molded article made from the above resin. The propylenic resin has favorable resistance to draw down and can produce a large-sized and lightweight blow molded article excellent in rigidity, dimensional stability and heat resistance.

7 Claims, No Drawings

HIGHLY RIGID PROPYLENIC RESIN AND BLOW MOLDED ARTICLE MADE THEREFROM

This is a Continuation of application Ser. No. 08/605,133 filed on Mar. 13, 1996, pending, which was filed as International application Ser. No. PCT/JP95/01406 filed Jul. 14, 1995.

TECHNICAL FIELD

The present invention relates to a highly rigid propylenic resin and a blow molded article made therefrom. More particularly, it pertains to a highly rigid propylenic resin which has favorable resistance to drawdown and can produce a large sized and lightweight blow molded part being excellent in rigidity, dimensional stability and heat resistance and to a blow molded article obtained therefrom which is particularly favorably usable for bumpers such as bumpers and bumper beams for automobiles.

BACKGROUND ART

Polypropylene as a resin for general purpose has heretofore been molded into a product with a desirable form and shape by any of various molding methods including extrusion molding, injection molding and blow molding. Of the above-mentioned molding methods, blow molding method has found its extensive use in molding large-sized structural materials typified by car parts because of its advantages in that molds therefor are inexpensive and that the production process can be simplified by integral molding methods. In this case, propylenic resin is frequently and extensively employed as raw materials from the viewpoint of specific gravity, rigidity, dimensional stability, heat resistance and the like.

However, the propylenic resin for general purpose is not necessarily sufficient in satisfying rigidity or resistance to drawdown which is required in blow molding and thus, various attemps have been made to improve such properties. There is proposed for example, in Japanese Patent Publication No. 36609/1988 (corresponding to U.S. Pat. No. 4,550, 145), a process for producing propylenic resin improved in drawdown property by constituting a combination of propylene homopolymer and propylene/ethylene copolymer at a specific intrinsic viscosity and a specific compositional ratio. However, such propylenic resin is not sufficient in rigidity when made into a molding, and thus further improvement has been desired. There are also disclosed a technique of improving the rigidity thereof by means of multistage polymerization and a nucleating agent (refer to Japanese Patent Publication No. 74264/1991), a technique of improving the resistance to drawdown thereof by means of specific multistage polymerization and a specific nucleating agent (refer to Japanese Patent Application Laid-Open No. 213547/1988) and the like technique.

However, although these techniques improve the rigidity and resistance to drawdown of propylenic resin to some extent, the problems still remain unsolved in that when an attempt is made to form a so-called large-sized blow molded part, that is, weighing about 5 kg or more, insufficiency in resistance to drawdown makes molding itself impossible or makes the thickness distribution ununiform, thus resulting in failure to produce a satisfactory molded product. Such being the case, the actual state is that in forming a large-sized blow molded article weighing 5 kg or more, propylenic resin is blended with polyethylene such as high density polyethylene to contrive to solve the problem of drawdown. Nevertheless, the blending of high density polyethylene greatly lowers the rigidity of the blended resin, and therefore, an inorganic filler such as talc is actually added to the resin.

At any rate, the characteristics inherent in propylenic resin are lost by blending polyethylene, talc or the like and in particular, the disadvantage that the pinch-off strength in blow molding is extremely lowered is caused thereby. Accordingly, it is desired to realize a specific propylenic resin capable of forming a large-sized blow molded article and coping with increase in weight due to the blending of talc. The above-mentioned problems should be solved in view of not only the technical aspect but also the social circumstances including the recycle of molded articles.

DISCLOSURE OF THE INVENTION

Under such circumstances, it is an object of the present invention to develop a highly rigid propylenic resin which has favorable resistance to drawdown and can produce a large sized, lightweight blow-molded part being excellent in rigidity, dimensional stability and heat resistance. It is another object to provide a blow molded article composed thereof which is favorably usable particularly for large-sized car parts such as bumpers, bumper beams, seat back and instrument panels.

In order to develop a highly rigid propylenic resin having the favorable properties as mentioned above and a blow molded article composed thereof, intensive research and investigation were accumulated by the present inventors. As a result, it has been found that the above-mentioned objects can be attained by means of a propylenic resin, especially a propylenic resin which is obtained through the formation of a propylene polymer and a propylene/ethylene copolymer by multistage polymerization, said resin having a melt index within a specific range also having a specific relationship between said melt index and the elongational viscosity thereof. The present invention has been accomplished by the foregoing finding and information.

That is to say, the present invention provides a highly rigid propylenic resin, especially a highly rigid propylenic resin which is obtained through the formation of a propylene polymer and a propylene/ethylene copolymer by multistage polymerization, said resin having a melt index [MI] in the range of 0.1 to 1.2 g/10 minutes as determined at a temperature of 230° C. under a load of 2,160 g and also satisfying a relationship between the [MI] and the elongational viscosity [Y(Pa.s)], said relationship being represented by the expression $$2.0 \times 10^5 \times MI^{-0.68} \leq Y \leq 8.0 \times 10^5 \times MI^{-0.68}$$

THE MOST PREFERRED EMBODIMENT TO CARRY OUT THE INVENTION

It is indispensable in the propylenic resin according to the present invention that the melt index [MI] determined at a temperature of 230° C. under a load of 2,160 g in accordance with JIS K-7210, be in the range of 0.1 to 1.2 g/10 minutes. An MI value less than 0.1 g/10 minutes brings about a remarkable decrease in the throughput quantity, thus deteriorating the productivity of the resin, whereas that more than 1.2 g/10 minutes makes it impossible to form a large-sized blow molded article. Taking moldability etc. into consideration, the MI is preferably in the range of 0.2 to 1.0 g/10 minutes.

In addition, the propylenic resin according to the present invention satisfies a relationship between the MI and the elongational viscosity [Y(Pa.s)], said relationship being represented by the expression $$2.0 \times 10^5 \times MI^{-0.68} \leq Y \leq 8.0 \times 10^5 \times MI^{-0.68},$$

preferably $$2.3 \times 10^5 \times MI^{-0.68} \leq Y \leq 4.8 \times 10^5 \times MI^{-0.68},$$

a Y value less than $2.0 \times 10 \times MI^{-0.68}$ results in severe drawdown of a parison at the time of blow molding, making it difficult to form a large-sized blow molded article weighing 5 kg or more, whereas that more than $8.0 \times 10^5 \times MI^{-0.68}$ leads to deterioration of the extrusion characteristics as well as the external appearance of the blow molded article.

The elongational viscosity [Y(Pa.s)] is measured with a stretch rheometer (for example, produced by Iwamoto Manufacturing Co., Ltd.) by the use of a bar sample with c.a. 3 mm diameter and 20 cm length by allowing the sample to stand in a silicone oil at 175° C. for 15 minutes under the conditions including 175° C. temperature, 0.05 sec$^{-1}$ strain velocity and 2.0 strain.

The process for producing the propylenic resin according to the present invention is not specifically limited provided that the process is capable of producing a propylenic resin which satisfies the above-mentioned conditions. There are usable a variety of processes, of which is preferable a process for producing a propylene polymer and a propylene/ethylene copolymer by multistage polymerization.

As the favorable multistage polymerization method, mention is made of a process in which through the use of a stereoregular catalyst, propylene polymers each having a different intrinsic viscosity [η] from one another are produced in the first and second stages, and a propylene/ethylene copolymer is produced in the third stage.

Examples of the aforesaid stereoregular catalyst to be used for the multistage polymerization include a catalyst comprising a halogenide of a transition metal, an organoaluminum compound and a substance to be added for preparing a polymer having improved stereoregularity and a broad molecular weight distribution such as a lactone.

Examples of the halogenide of a transition metal preferably include halogenides of titanium, of which titanium trichloride is particularly preferable. The titanium trichloride is exemplified by that prepared by reducing titanium tetrachloride through any of various methods; that prepared by further activating the preceding titanium tetrachloride through any of various methods; that prepared by further activating the preceding titanium trichloride by means of a treatment in a ball mill and/or solvent cleaning (for example, cleaning with an inert solvent or an inert solvent containing a polar compound); and that prepared by subjecting titanium trichloride or a titanium trichloride eutectic such as TiCl$_3$.1/3 AlCl$_3$ to a crushing treatment together with an amine, an ether, an ester, sulfur, a halogen derivative or an organic or inorganic nitrogen or phosphorus compound. There is also usable a halogenide of titanium supported on a magnesium-based carrier.

Examples of the organoaluminum compound include a compound represented by the general formula (I)

$$AlR_nX_{3-n} \tag{I}$$

wherein R is an alkyl group having 1 to 10 carbon atoms, X is a halogen atom, and n is a number satisfying 0<n≦3.

Specific examples of such organoaluminum compound include dimethylaluminum chloride, diethylaluminum chloride, ethylaluminum sesquichloride, ethylaluminum dichloride and triethylaluminum. The organoaluminum compound may be used alone or in combination with at least one other. It is used in an amount of usually 1 to 100 moles per one mole of the above-mentioned halogenide of a transition metal.

Example of lactones include a compound represented by the general formula (II)

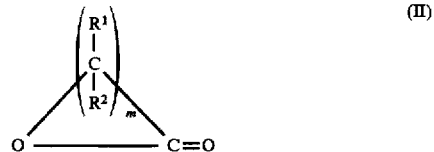

wherein R$^1$ and R$^2$ are each a hydrogen atom or a hydrocarbon group having at most 20 carbon atoms and belonging to saturated aliphatic series, unsaturated aliphatic series, alicylic series or aromatic series, and may be the same as or different from each other, and m is an integer from 2 to 8.

As the lactone of the general formula (II), mention is made of γ-lactons such as γ-butyroloctone, γ-valerolactone, γ-caproloctone, γ-capryloctone, γ-laurolactone, γ-palmilactone, γ-stearolacton; δ-lactones such as δ-valerolactone and δ-caproloctone; ε-lactons such as ε-caprolactone; and β-loctones such as β-propiolactone and dimethylpropiolactone. Of these lactones, γ-loctones and ε-lactones are preferable, and γ-butyrolactone, γ-caprolactone and ε-caproloctone are particularly preferable. Any of these lactones may be used alone or in combination with at least one other. It is used in an amount of usually 0.01 to 10 moles per one mole of the above-mentioned halogenide of a transition metal.

In the foregoing multistage polymerization, it is preferable in the first stage to carry out the polymerization of propylene at a temperature of 50° to 70° C. so as to produce a propylene polymer having an intrinsic viscosity [η] of 0.5 to 3.5 dL (deciliter)/g (in decalin, 135° C.) in an proportion of 60 to 80% by weight based on the whole amount of the polymer. An intrinsic viscosity [η] of the propylene polymer less than 0.5 dL/g brings about a low impact strength of the propylenic resin to be produced, whereas that more than 3.5 dL/g causes a decrease in throughput quantity of the resin at the time of blow molding, in certain cases. A proportion of the polymer produced in the first stage less than 60% by weight results in insufficient rigidity of the propylenic resin to be produced, whereas that more than 80% by weight gives rise to deterioration of the impact strength thereof, in certain cases.

Next, it is preferable in the second stage to carry out the polymerization of propylene at a temperature of 50° to 70° C. so as to produce a propylene polymer having an intrinsic viscosity [η] of 3.5 to 5.5 dL/g (in decalin, 135° C.) in a proportion of 10 to 20% by weight based on the whole amount of the polymer. An intrinsic viscosity [η] of the propylene polymer less than 3.5 dL/g brings about a low impact strength of the propylenic resin to be produced, whereas that more than 5.5 dL/g causes a decrease in throughput quantity of the resin at the time of blow molding, in certain cases. A proportion of the polymer produced in the second stage less than 10% by weight results in insufficient rigidity of the propylenic resin to be produced, whereas that more than 20% by weight gives rise to deterioration of the impact strength thereof, in certain cases.

Moreover, it is preferable in the third step to carry out the copolymerization of propylene and ethylene at a temperature of 45° to 65° C. so as to produce a propylene/ethylene copolymer having an intrinsic viscosity [η] of 3.5 to 5.5 dL/g (in decalin, 135° C.) and an ethylene unit content of 40 to 75% by weight in a proportion of 8 to 15% by weight based on the total amount of the polymer. An intrinsic viscosity [η] of the propylene/ethylene copolymer of less than 3.5 dL/g brings about a low impact strength of the propylenic resin to be produced, whereas that more than 5.5 dL/g causes a decrease in throughput quantity of the resin at the time of blow molding, in certain cases. A proportion of the copolymer produced in the third stage less than 8% by weight results in a low impact strength of the propylenic resin to be produced, whereas that more than 15% by weight gives rise to deterioration of the rigidity thereof, in certain cases. An ethylene unit content of less than 40% by weight in the copolymer results in a low impact strength of the propylenic resin to be produced, whereas that of more than 60% by weight leads to deterioration of the rigidity, in certain cases. The ethylene unit content in the copolymer can be obtained by measuring infrared absorption spectrum.

The modulation for the intrinsic viscosity [η] of the polymer in each of the stages can be carried out, for example, by properly altering the concentration of a molecular weight modulator such as hydrogen. The pressure in the polymerization reaction is selected in each stage in the range of usually atmospheric pressure to 30 kg/cm$^2$G, preferably 1 to 15 kg/cm$^2$G.

As the polymerization system, there are applicable a continuous method by using at least three polymerization vessels, a batchwise method by using at least one polymerization vessel and a method by the combination of the above-mentioned continuous method and batchwise method. As the polymerization method, there are adoptable, without specific limitation, suspension polymerization, solution polymerization, gas-phase polymerization or the like.

As a solvent, when used, mention is made of an aliphatic hydrocarbon such as heptane and hexane, an alicyclic hydrocarbon such as cyclohexane and an aromatic hydrocarbon such as benzene and toluene. Any of the solvents may be used alone or in combination with at least one other.

The propylenic resin thus obtained according to the present invention has favorable resistance to drawdown and can afford a large-sized blow molded part which is lightweight and excellent in rigidity, dimensional stability and heat resistance.

The blow molded article according to the present invention is produced through the blow molding of the above-mentioned propylenic resin by blending therewith as desired, any of additives such as soft elastomer, modified polyolefin, antioxidant, heat resistant stabilizer, weather resistance stabilizer, inorganic or organic filler, nucleating agent, antistatic agent, chlorine scavenger, slip agent, flame retardant and coloring agent. As the blow molding method, there is usable, without specific limitation, a method which has been customarily employed in the blow molding of propylenic resin.

In comparison with the blow molded article produced by blow molding the polypropylene blended with a large amount of an inorganic filler such as talc which has heretofore been used in general, the blow molded article according to the present invention is lightweight and excellent in rigidity, dimensional stability and heat resistance, and is preferably used particularly for bumpers including car bumpers and car bumper beams.

In the following, the present invention will be described in more detail with reference to examples, which however, shall not be construed to limit the present invention thereto.

Determinations were made of the melt index [MI] and elongational viscosity [Y] of the propylenic resin by the methods described herein, of the ethylene unit content by measuring the infrared absorption spectrum, of the tensile modulus according to JIS K7113, and of the Izod impact value (at −20° C.) according to JIS K7110.

The intrinsic viscosity [η] of the polymer in each of the stages is that measured in decalin at 135° C.

EXAMPLE 1

A 10 L (liter) autoclave equipped with a stirrer was charged with 4 L of n-heptane, 5.7 mmol of diethylaluminum chloride, 0.7 g of titanium trichloride and 0.2 mL (milliliter) of ε-caprolactone.

Thereafter, the autoclave was continuously fed with hydrogen which had been weighed so as to attain a prescribed intrinsic viscosity [η] of the propylene polymer to be produced and with propylene so as to attain a reaction pressure of 9 kg/cm$^2$G, while the liquid-phase temperature was maintained at 60° C., to carry out the first stage reaction under stirring for 90 minutes. Subsequently, the unreacted propylene was removed, and hydrogen thus weighed along with propylene were continuously fed in the autoclave so as to attain a reaction pressure of 7 kg/cm$^2$G, while the temperature therein was maintained at 60° C., to carry out the second stage reaction for 40 minutes.

Further, the mixture of propylene and ethylene and hydrogen thus weighed were continuously fed in the autoclave so as to attain a reaction pressure of 5 kg/cm$^2$G, while the temperature therein was maintained at 57° C., to carry out the third stage reaction for 30 minutes.

To the resultant polymerization product was added n-butanol, and the mixture was stirred at 65° C. for one hour to decompose the catalyst and was subjected to the steps of separation, cleaning and drying with the result that propylenic resin in the form of white powder was obtained.

The intrinsic viscosity [η] and the polymerization amount of the polymer obtained in each of the polymerization stages are given in Table 1. Further, the physical properties of the objective propylenic resin are given in Table 2.

EXAMPLE 2

The procedure in Example 1 was repeated to carry out the polymerization except that the intrinsic viscosity [η] and the polymerization amount of the polymer obtained in each of the polymerization stages were altered as shown in Table 1. The results obtained are given in Table 2.

EXAMPLE 3

The procedure in Example 1 was repeated to carry out the polymerization except that the intrinsic viscosity [η] and the polymerization amount of the polymer obtained in each of the polymerization stages were altered as shown in Table 1. The results obtained are given in Table 2.

EXAMPLE 4

To the polymer which had been obtained in Example 1 was added 0.1% by weight of sodium salt of methylenebis (2,4-di-tert-butylphenol)acid phosphate as the nucleating agent to form a propylenic resin. The physical properties thereof are given in Table 2.

Comparative Examples 1 & 2

A 10 L(liter) autoclave equipped with a stirrer was charged with 5 L of dehydrated n-hexane, 1.0 g of diethylaluminum chloride and 0.3 g of titanium trichloride.

Thereafter, the autoclave was continuously fed with hydrogen which had been weighed so as to attain a prescribed intrinsic viscosity [η] of the propylene polymer to be produced and with propylene so as to attain a reaction pressure of 9 kg/cm²G, while the liquid-phase temperature was maintained at 65° C., to carry out the first stage reaction under stirring for 90 minutes. Subsequently, the unreacted propylene was removed, and the liquid-phase temperature was lowered to 50° C.

Then, hydrogen thus weighed along with propylene were continuously fed in the autoclave so as to maintain a reaction pressure of 9 kg/cm²G, and a reaction temperature of 50° C., to carry out the second stage reaction for 40 minutes.

Further, the mixture of propylene and ethylene and hydrogen thus weighed were continuously fed in the autoclave so as to attain a reaction pressure of 9 kg/cm²G, while the temperature therein was maintained at 50° C., to carry out the third stage reaction for 30 minutes. Then, the unreacted gas was removed, and to the resultant polymerization product was added n-butanol, and the mixture was stirred at 65° C. for one hour to decompose the catalyst and was subjected to the steps of separation, cleaning and drying with result that a polymer in the form of white powder was obtained.

The polymerization was carried out by altering the intrinsic viscosity [η] and the polymerization amount of the polymer in each of the polymerization stages as given in Table 1. Further, the physical properties of the objective polypropylenic resin are given in Table 2.

Comparative Example 3

The procedure in Example 1 was repeated to carry out the polymerization except that the addition of ε-caprolactone as the catalyst was omitted. The intrinsic viscosity [η] and the polymerization amount of the polymer in each of the polymerization stages are given in Table 1, and the physical properties of the objective propylenic resin are given in Table 2.

Comparative Example 4

The procedure in Example 1 was repeated to carry out the polymerization except that the intrinsic viscosity [η] and the polymerization amount of the polymer obtained in each of the polymerization stages were altered as shown in Table 1. The results obtained are given in Table 2.

Comparative Example 5

The procedure in Example 1 was repeated to carry out the polymerization except that the polymerization was performed in two stages instead of three stages and instead, the polymerization amount in the first stage was increased. The intrinsic viscosity [η] and the polymerization amount of the polymer in each of the polymerization stages are given in Table 1, and the physical properties of the objective propylenic resin are given in Table 2.

Comparative Example 6

The mixture having the under-mentioned composition was incorporated with a prescribed antioxidant and thereafter was kneaded by the use of a bidirectional twin-screw kneader (produced by Kobe Steel Ltd., model 2FCM) at a temperature set to 200° C. at a number of screw revolutions of 800 r.p.m. while the temperature of the resulting melt was 250° C. The kneaded product was formed into strands by means of an extruder, and then granulated with a pelletizer to produce a composite material for bumper beam. The results of the measurement of the physical properties are given in Table 2.

| | |
|---|---|
| Polypropylene (ethylene unit content: 5% by weight, MI: 0.9 g/10 minutes) | 70% by weight |
| High density polyethylene (HLMI: 3.8 g/10 minutes) | 20% by weight |
| Talc | 10% by weight | where HLMI indicates MI (melt index) measured under the conditions of 190° C. temperature and 21.6 kg load.

TABLE 1

| | First stage | | Second stage | | Third stage | |
|---|---|---|---|---|---|---|
| | [η] | polymerization amount (% by weight) | [η] | polymerization amount (% by weight) | [η] | polymerization amount (% by weight) |
| Example 1 | 3.0 | 74 | 4.5 | 14 | 4.5 | 12 |
| Example 2 | 2.4 | 74 | 4.5 | 12 | 4.8 | 14 |
| Example 3 | 2.4 | 75 | 4.0 | 16 | 4.2 | 9 |
| Example 4 | 3.0 | 74 | 4.5 | 14 | 4.5 | 12 |
| Comp. Example 1 | 2.9 | 76 | 5.9 | 10 | 4.6 | 14 |
| Comp. Example 2 | 2.4 | 78 | 7.2 | 12 | 9.4 | 10 |
| Comp. Example 3 | 3.0 | 75 | 4.3 | 13 | 4.5 | 12 |
| Comp. Example 4 | 1.5 | 78 | 4.8 | 12 | 5.3 | 10 |
| Comp. Example 5 | 3.4 | 89 | — | — | 4.2 | 11 |

Remarks: Comp. = Comparative

TABLE 2

| Physical properties of propylenic resin | | |
|---|---|---|
| | ethylene unit content (% by weight) | MI (g/10 minutes) |
| Example 1 | 6.0 | 0.30 |
| Example 2 | 6.3 | 0.60 |
| Example 3 | 6.3 | 0.80 |
| Example 4 | 6.0 | 0.30 |
| Comp. Example 1 | 2.9 | 0.27 |
| Comp. Example 2 | 6.2 | 0.36 |
| Comp. Example 3 | 6.0 | 0.30 |
| Comp. Example 4 | 4.7 | 8.50 |
| Comp. Example 5 | 5.3 | 0.30 |

| Physical properties of propylenic resin | | |
|---|---|---|
| | Tensile modulus (MPa) | Izod impact value at −20° C. (kJ/m²) | elongational viscosity Y (Pa × s) |
| Example 1 | 1,490 | 3.7 | $6.5 \times 10^5$ |
| Example 2 | 1,400 | 4.4 | $4.2 \times 10^5$ |
| Example 3 | 1,520 | 3.2 | $2.8 \times 10^5$ |

TABLE 2-continued

| | | | |
|---|---|---|---|
| Example 4 | 1,650 | 3.9 | $6.8 \times 10^5$ |
| Comp. Example 1 | 1,600 | 3.0 | $4.2 \times 10^5$ |
| Comp. Example 2 | 1,500 | 3.5 | $2.8 \times 10^5$ |
| Comp. Example 3 | 1,380 | 3.6 | $4.0 \times 10^5$ |
| Comp. Example 4 | 1,580 | 3.4 | not measurable |
| Comp. Example 5 | 1,450 | 3.9 | $3.1 \times 10^5$ |
| Comp. Example 6 | 1,500 | 3.5 | $2.8 \times 10^5$ |

EXAMPLES 5 to 8 AND COMPARATIVE EXAMPLES 7 to 12

Each of the propylenic resins obtained by means of scale up and in accordance with the conditions in Examples 1 to 4 and Comparative Examples 1 to 6, respectively, was molded into a car bumper beam (1400×100×100 mm in size and 5 kg in weight) and a truck bumper (2100×400×70 mm in size and 7.2 kg in weight) under the molding conditions and temperature conditions as described hereunder, except that the truck bumper was produced only in Example 8.

(Molding conditions)

molding machine: 90 mm in diameter screw: 90 mm in diameter die: 100 mm in diameter accumulator: 15 liter (car bumper beam) 25 liter (truck bumper)

mold clamping force: 60 ton number of screw revolutions: 40 r.p.m.

electric motor load: 115 A (Temperature conditions)

cylinder
No. 1: 230° C.
No. 2: 210° C.
No. 3: 190° C.
No. 4: 190° C.

crosshead
No. 1: 190° C.
No. 2: 190° C.
No. 3: 190° C.

die
No. 1: 190° C.
No. 2: 190° C.

molding cycle: 200 sec mold temperature: 28° C.

resin temperature: 225° C.

Investigations were made of (1) moldability, (2) thickness distribution and appearance, (3) product rigidity, (4) throughput quantity, (5) pinch-off strength and (6) impact resistance for each of the car bumper beams and truck bumpers produced in the aforesaid manners, and overall evaluations were carried out based on the investigation results. The evaluation results are given in Tables 3 to 5, in which Table 3 gives the results obtained in Example 8 only, while Tables 4 and 5 give the results obtained in the production of car bumper beams.

The measurement and evaluation in each of the investigation items were carried out according to the following standards.

(1) Moldability

Propylenic resin for a bumper beam parison with necessary length/weight of 1900 mm/10 kg and that for a bumper parison with necessary length/ weight of 2600 mm/15 kg were each injected from an accumulator to form a parison. The moldability was evaluated by the variation in the length of the parison during 5 seconds, that is, the mold closing time.

| | |
|---|---|
| L/Lo < 1.10 | ⊚ Good |
| 1.10 ≦ L/Lo ≦ 1.15 | ○ Fair |
| L/Lo > 1.15 | X Poor | where,

Lo: parison length at the end of injection

L: parison length after 5 seconds from the end of injection (2) Thickness distribution Thickness distribution was evaluated by measuring the thickness of each of the cross sections of the blow molded article.

| | | |
|---|---|---|
| Variation in thickness | ≦10% | ⊚ Good |
| Variation in thickness | >10%, ≦20% | ○ Fair |
| Variation in thickness | >20% | X Poor |

(3) Product rigidity (rigidity for dishing at 100 kg)

Product rigidity was evaluated by comparing its distorsion with that of a steel-made product.

○ ≦3 mm in distortion (same as or smaller than the distortion of the steel-made)

X >3 mm in distortion (larger than the distortion of the steel-made)

(4) throughput performance

Throughput performance was evaluated by measuring the throughput quantity per one hour by the use of a blow molding machine of 90 mm in diameter, and by comparing the throughput quantity thus measured with that of the composite material used in Comparative Example 6.

⊚ Superior to the composite material

○ Comparable to the composite material (5) Pinch-off strength

In the production of a blow molded article, a fusing adhesion part which is called pinch-off part is formed at the time of mold closing by the fusing adhesion of the inside of a parison with each other. The pinch-off part is apt to become a starting point of rupture or break, and thus a structural part and a part requiring strength are needed to be improved in the fusing adhesivity of the pinch-off part. Accordingly, the fusing adhesivity of the pinch-off part was evaluated by the following procedure.

By the use of each of the resins that had been obtained in Example 4 and Comparative Examples 6, a bottle having a prescribed shape was prepared by blow molding, and a strip test piece with 20 mm width was cut out from the bottom of the bottle so as to include the pinch-off in the width direction. The test piece thus obtained was notched with a notching blade of 2.0 mm in R at both the ends of the pinch-off part so that the pinch-off part had 10 mm width. The test piece was tested at a tensile velocity of 50 mm/minute by the use of a tensile test machine (produced by INSTRON Corp. in U.S.A under the tradename INSTRON 1125). The yield strength and rupture energy were regarded as the index of the pinch-off strength. Specifically, the enhancement of the fusing adhesivity increases with an increase in each of the foregoing values. The yield strength is represented by the maximum stress value in the stress strain diagram, while the rupture energy is represented by the the product [(stress)×(strain)] which is obtained by integrating the stress with respect to the strain from zero to the rupture point in the range of the strain. For the sake of simplicity, the rupture energy can be shown by the area which is surrounded by the stress strain diagram and the abscissa.

(6) Impact resistance

A bumper beam which had been obtained by blow molding each of the resins as obtained in Example 4 and Comparative Example 6 was subjected to pendulum test in accordance with Federal Motor Vehicle Safety Standards (abbreviated to FMVSS) PART 581. Specifically, the bumper beam was fitted to a bogie of 1000 kg in weight, and an impact ridge of 1000 kg in weight was allowed to collide with the bumper beam at a velocity of 5 miles/hour (about 8 km/hour) to obtain the relation between the generated load and the distortion size of the beam, while the place of the collision was made to the central part of the beam. The test temperatures were each set to a high temperature (50° C.), ordinary temperature (23° C.) and a low temperature (−10° C. and −30° C.) taking into consideration of the conditions under which the bumper beam is mounted on a commercial car. The evaluation was carried out by the maximum distortion and the occurrence of crack.

TABLE 3

|  | Car bumper beam | Truck bumper |
| --- | --- | --- |
| Parison length | 1,900 mm | 2,600 mm |
| Parison weight | 10 kg | 15 kg |
| Product length | 1,400 mm | 2,100 mm |
| Product weight | 5 kg | 7.2 kg |
| Moldability | 1.06 | 1.09 |
| Thickness distribution | Thickness variation <10% | Thickness variation <10% |
| Rigidity | Distortion: little | Distortion: little |
| Impact resistance | Abnormality: none | Abnormality: none |
| Overall evaluation | good | good |

TABLE 4

| | Resin used | Moldability L/Lo | Thickness distribution (%) | External appearance*¹ |
| --- | --- | --- | --- | --- |
| Example 5 | Example 1 | 1.07 ⊚ | 7 ⊚ | ○ |
| Example 6 | Example 2 | 1.10 ○ | 15 ○ | ○ |
| Example 7 | Example 3 | 1.15 ○ | 18 ○ | ○ |
| Example 8 | Example 4 | 1.06 ⊚ | 6 ⊚ | ○ |
| Comp. Example 7 | Comp. Example 1 | 1.15 ○ | 20 Δ | ○ |
| Comp. Example 8 | Comp. Example 2 | 1.20 X | 22 X | ○ |
| Comp. Example 9 | Comp. Example 3 | 1.17 ○ | 22 X | ○ |
| Comp. Example 10 | Comp. Example 4 | — X | — XX | — |
| Comp. Example 11 | Comp. Example 5 | 1.20 X | 25 X | Δ |
| Comp. Example 12 | Comp. Example 6 | 1.14 ○ | 20 ○ | ○ |

TABLE 4-continued

| | Product rigidity | throughput performance | Overall*² evaluation |
| --- | --- | --- | --- |
| Example 5 | ○ | ○ | ⊚ |
| Example 6 | ○ | ⊚ | ○ |
| Example 7 | ○ | ⊚ | ○ |
| Example 8 | ○ | ○ | ⊚ |
| Comp. Example 7 | ○ | ○ | Δ |
| Comp. Example 8 | ○ | ○ | X |
| Comp. Example 9 | X | ○ | Δ |
| Comp. Example 10 | — | ⊚ | X |
| Comp. Example 11 | ○ | ○ | X |
| Comp. Example 12 | ○ | ○ | Δ |

*¹External appearance
○: Wrinkle or strain being hardly observed
Δ: Wrinkle or strain being caused to some extent
*²Overall evaluation
⊚: Fully satisfying product performance requirement
○: Satisfying product performance requirement
Δ: Somewhat inferior to aimed product performance
X: Greatly inferior to aimed product performance

TABLE 5

| | | | Example 8 | Comparative Example 12 |
| --- | --- | --- | --- | --- |
| Pinch-off strength | Yield strength (kgf) | | 72 | 43 |
| | Rupture energy (kgf · mm) | | 94 | 9.0 |
| Pendulum test | high temperature (50° C.) | maximum distortion (mm) | 55 | 73 |
| | | crack | — | — |
| | ordinary temperature (23° C.) | maximum distortion (mm) | 55 | 73 |
| | | crack | — | — |
| | low temperature (−10° C.) | maximum distortion (mm) | 38 | 37 |
| | | crack | — | — |
| | (−30° C.) | maximum distortion (mm) | 36 | not measurable |
| | | crack | — | Remarkably damaged from pinch-off fusion part as starting point |

In the overall evaluation in Table 4, the results of pinch-off strength and impact resistance were taken into consideration as well.

In addition, it has been demonstrated in Table 5 that the yield strength in Example 8 is about 1.7 times that in Comparative Example 12 and the fusing adhesivity in Example 8 expressed in terms of rupture energy is about 10 times that in Comparative Example 12. It is thought that the manifestation of the excellent impact resistant in the pendulum test in Example 8 is due to the remarkable improvement in the fusing adhesivity of the pinch-off part.

INDUSTRIAL APPLICABILITY

The blow molded articles obtained from the highly rigid propylenic resin according to the present invention are favorably usable particularly for large-sized car parts such as bumpers, bumper beams, seat back and instrument panels.

We claim:

1. A rigid propylenic resin, wherein said resin has a melt index (MI) from 0.1 to 1.2 g/10 minutes determined at a temperature of 230° C. and a load of 2,160 g and satisfying a relationship between said melt index and the elongational viscosity (Y (Pa.s)), wherein said relationship is represented by the equation:

$$2.0 \times 10^5 \times MI^{-0.68} \leq Y \leq 8.0 \times 10^5 \times MI^{-0.68}.$$

2. The resin of claim 1, wherein said melt index is from 0.2 to 1.0 g/10 minutes.

3. The resin of claim 1, wherein said relationship is represented by the equation:

$$2.3 \times 10^5 \times MI^{-0.68} \leq Y \leq 4.8 \times 10^5 \times MI^{-0.68}.$$

4. The resin of claim 1, wherein said resin is prepared by a process comprising the formation of a propylene polymer and a propylene/ethylene copolymer by multistage polymerization.

5. The resin of claim 4, wherein said multistage polymerization is achieved through the use of a stereoregular catalyst for producing propylene polymers each having a different intrinsic viscosity from one another in a first stage and in a second stage, and producing a propylene/ethylene copolymer in a third stage.

6. A blow molded article which comprises the resin claimed in claim 5.

7. A blow molded article which comprises the resin claimed in claim 4.

* * * * *